United States Patent [19]

Chang et al.

[11] Patent Number: 4,649,092

[45] Date of Patent: Mar. 10, 1987

[54] CADMIUM NEGATIVE ELECTRODE

[75] Inventors: Victor A. Chang, Miami; Angel A. Reyes, North Miami; Martin P. Jegers, Davie; Frantz Valias-Jean, Lauderhill, all of Fla.

[73] Assignee: Motorola, Inc., Schaumburg, Ill.

[21] Appl. No.: 689,352

[22] Filed: Jan. 7, 1985

[51] Int. Cl.$^4$ .............................................. H01M 4/24
[52] U.S. Cl. ..................................... 429/217; 429/222
[58] Field of Search ................................ 429/222, 217

[56] References Cited

U.S. PATENT DOCUMENTS

| | | |
|---|---|---|
| 2,366,402 | 1/1945 | Hauel . |
| 2,820,077 | 1/1958 | Salauze . |
| 3,379,570 | 4/1968 | Berger et al. . |
| 3,775,273 | 11/1973 | Haines et al. . |
| 3,847,784 | 11/1974 | Przybyla . |
| 3,870,562 | 3/1974 | Catherino . |
| 4,414,303 | 11/1983 | Williamson, III et al. . |
| 4,482,374 | 11/1984 | Osborn et al. . |

FOREIGN PATENT DOCUMENTS 59-83344 5/1984 Japan .

OTHER PUBLICATIONS

Falk & Salkind, "Alkaline Storage Batteries" 1969, John Wiley & Sons, pp. 88–111, 436–473.
"Eveready Battery Applications and Engineering Data", 1971, Union Carbide Corp. pp. 304–307, 314–321.
Chemical Abstracts: 101: 195234P, Cadmium Anodes, Sanyo Electric Co. Ltd. Japan Nov. 4, 1982 (RE Document #AL).

Primary Examiner—Donald L. Walton
Attorney, Agent, or Firm—Joseph T. Downey; Anthony B. Sarli; Donald B. Southard

[57] ABSTRACT

A rechargeable high energy density cell having a metal—metal oxide negative electrode, more specifically, the metal being cadmium, wherein the metal is in the form of thin flakes. Such cells show improved energy density and cycle life when charged-discharged at higher rate and to 100% depth of discharge.

15 Claims, 9 Drawing Figures

CADMIUM NEGATIVE ELECTRODE

FIELD OF INVENTION

This invention relates to an improved cadmium negative electrode and a method of making such a cadmium negative electrode from suitable particulate metal plate material for use in a rechargeable high energy density electrochemical cell.

BACKGROUND OF THE INVENTION

The typical method of manufacture of cadmium electrodes for rechargeable cells is by impregnation of a sintered nickel plaque with an aqueous cadmium salt solution. This solution may contain various additives to facilitate the introduction of the cadmium salts into the plaque. Other components necessary for the later conversion of the cadmium salts to cadmium hydroxide in accordance with the particular process used are also included. The sintered nickel plaque does not constitute an active electrode, but merely provides a current carrier and support matrix for the active material, cadmium hydroxide.

Alternately, cadmium hydroxide may be applied as a paste to a current-carrying substrate of suitable material. Such a paste may begin as cadmium hydroxide or as cadmium oxide which later gains water to become cadmium hydroxide. It is customary in such paste systems to include metallic cadmium and/or nickel particles in order to provide a conductive matrix as disclosed in U.S. Pat. No. 3,775,273. While analogies with wet primary cells are frequently drawn, it should be noted that there are several major differences, including the fact that the cadmium electrode must function in a different electrochemical manner during the charge and discharge portions of its cycle. For such rechargeable cells, the cadmium hydroxide itself constitutes one electrode, the free hydroxyl ions form the electrolyte and active nickel hydroxide forms the second electrode. The physical substrates in such cells are merely current conductors to establish external contacts for the active electrochemical materials.

Subsequent to the manufacture of impregnated or pasted cadmium hydroxide electrodes it is normally necessary to execute a repeated charge discharge or formation cycle in a suitable electrolyte, such as aqueous sodium hydroxide solution. The function of this formation cycle is to produce cadmium metal particles or to convert those already included in the electrode to an electrochemically active form which provides a reserve of undischarged material. This formation cycle is carried out prior to assembly of the negative plates into rechargeable cells or prior to closing of the cells when carried out in situ with a large excess of electrolyte.

It has been recognized as desirable to be able to assemble a cell in its final usable state without need of this formation cycle, thus allowing construction of a cell from uncharged positive and negative electrodes. In general, two parameters determine the efficiency of cadmium metal incorporated in a battery electrode for the purpose of providing electrochemical precharge as a means of eliminating the formation cycle. These are: (1) Total surface area, and (2) particle size. In order to have electrochemical activity, a large surface is desired to provide sites for electrochemical reactions. In the case of metallic cadmium, this surface undergoes the discharge half-reaction:

$$Cd + 2OH^- \rightleftharpoons Cd(OH)_2 + 2e^-$$

during normal battery use.

It is apparent from this reaction that the cadmium metal must be in contact with a sufficient number of hydroxyl ions. Thus, the total surface area is critical for the precharge. But in addition, the battery must function over some period of time which may include several recharge cycles. In order to establish sufficient activity within a cell over the period of its life, there must be a sufficient cadmium reserve to make up for the generation of occluded pockets of cadmium formed during the charge cycle, which results in a condition known as "densification." By providing an electrochemical reserve of readily oxidizable cadmium material, a cell made from such a negative electrode matched with a suitable positive electrode will exhibit much less reduction in its capacity with successive charge-discharge cycles. This loss of the capacity is typical of cells which are lacking in readily oxidizable cadmium mass. It is believed that this phenomenon is caused by some of the cadmium material, produced from charging the active cadmium hydroxide, becoming occluded upon subsequent discharge, thereby resulting in inactivity. To maintain capacity through many cycles, a reserve from which active cadmium material may be drawn is provided.

In the past, cadmium metal particles have been produced in various shapes by differing methods. One method produces a finely divided "sponge-like" cadmium metal through electrolysis in conjunction with cadmium hydroxide which will, upon drying, produce a suitable mixture for manufacture of battery electrodes. However, there is no indication that the cadmium so produced has any significant electrochemical activity, and thus may not serve as an adequate precharge. The primary reasons for its use are to increase the bulk density of the electrode starting material and to provide an improved separation of the cadmium hydroxide particles so that the mixture is no longer sticky and may be easily poured.

Another type of cadmium particles is described generally as cylindroidal, but are more specifically dendritic, or tree-like, in structure as disclosed in U.S. Pat. Nos. 2,820,077 and 3,847,784. Acicular is defined as sharp, slender or needle shaped. It is known that the prior mentioned spongy cadmium made by electrolysis is unsatisfactory because it does not possess the necessary electrochemical activity for use in battery electrodes. The dendritic form of cadmium is made by the action of powdered aluminum or zinc on solutions of cadmium salts. This action produces the dentritic crystalline structures of the cadmium. While this form of cadmium may be more electrochemically active than cadmium from other processes, the dendritic structure is considered undesirable in batteries due to its marked propensity for causing short circuits to the positive plate as a result of additional crystalline growth during the battery cycle life.

Still another method of making cadmium particles is in the formation of non-spherical, irregular, gnarled, cylindroidal or sausage-like particles as described in U.S. Pat. No. 4,414,303.

One danger that is inherent in the use of small active particles is their pyrophoricity. The pyrophoricity or flammability of the powderized form of a given metal or material will vary with the process used to produce it. This is due to the surface area per unit weight ratio known as specific surface area of the material or the chemical reactivity of the material itself either of which may vary. High specific surface area makes a material more readily pyrophoric.

The desired cadmium metal structure for electrodes will have a high total surface for electrochemical activity, but a low specific surface area to reduce the pyrophoricity. It is known as disclosed in U.S. Pat. No. 3,870,562 that precharge activity can be produced by spherical particles in the specific size range of 3 to 12 microns made by a process of condensation from metallic cadmium vapors. These were considered to be small enough (large total surface area) to be electrochemically active, but large enough (lower specific surface area) not to be pyrophoric. However, it was found that beyond 12 microns, the cadmium particles have markedly diminished electrochemical activity and are not usable.

Furthermore, it is well known that the ignition temperature of a given particle size can be raised by a slight amount of oxidation; with the effect being most marked for the finer powders. Thus, some oxidation can reduce the tendency for pyrophoricity. While the prior spherical powder is purported to be relatively safe, it is still necessary to take many precautions. What is missing is a pyrophorically safe, yet electrochemically active cadmium material for use as a negative electrode.

SUMMARY OF THE INVENTION

An object of this invention is to produce an improved electrochemical rechargeable cell by means of a cadium negative electrode manufactured in the uncharged state, containing an electrochemical reserve of cadmium precharge formed from pyrophorically improved material.

It is another object of this invention that the electrode shall be manufactured using a metal cadmium powder having particles of a sufficient total surface area to provide the requisite electrochemical activity.

It is still another object of this invention to provide a cadmium reserve in a negative cadmium electrode for a nickel-cadmium cell e.g. as disclosed in U.S. Pat. Nos. 2,366,402 and 3,379,570 by utilizing very thin flakes of cadmium of about one micron in thickness which permits substantially full return of the charged capacity of the electrode and substantially inhibits the deleterious effect of continuous densification of metallic cadmium over many hundred cycles of discharging and charging of the cell.

Another object of this invention is to employ cadmium with high specific area to obtain more integral contact of cadmium metal to cadmium hydroxide.

Yet another object of this invention is to obtain more uniform current densities in the negative electrode thereby resulting in a reduction in densification rate and lengthening the time to effect densification.

Still a further object of this invention is optimization of surface area to thickness ratio of the cadmium flakes without incurring dangers of pyrophoricity.

DESCRIPTION OF THE INVENTION

Figure 1:
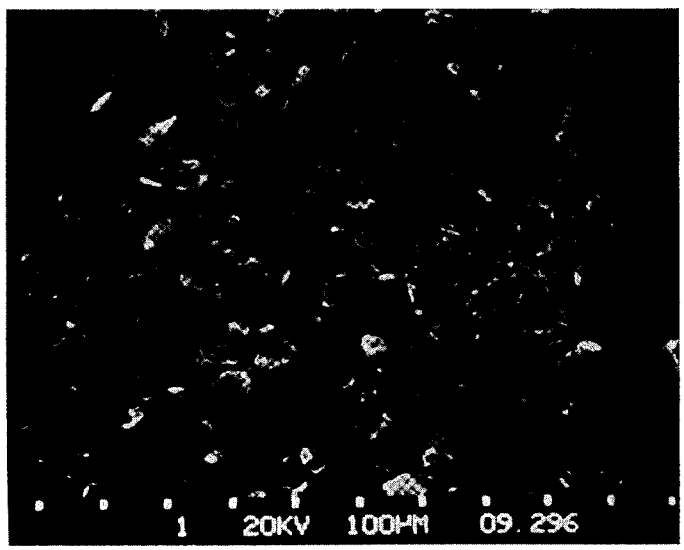
FIG. 1 is a photomicrograph showing cadmium flakes at 100× magnification.
Figure 2:
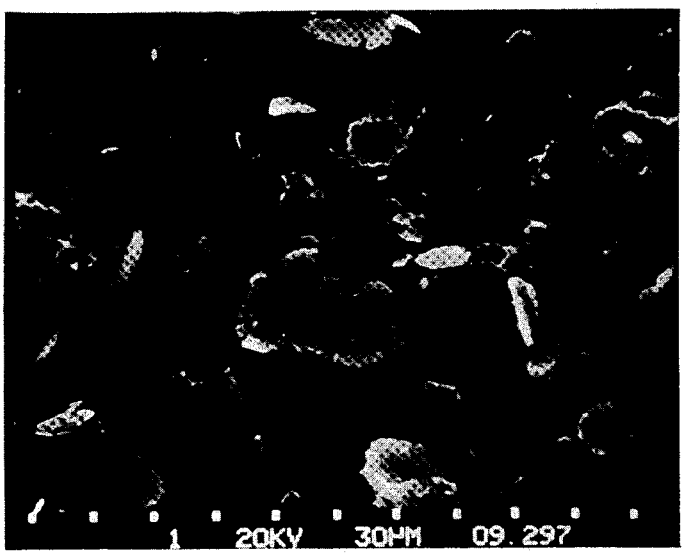
FIG. 2 is a photomicrograph showing the cadmium flakes of FIG. 1 at 300× magnification.
Figure 3:
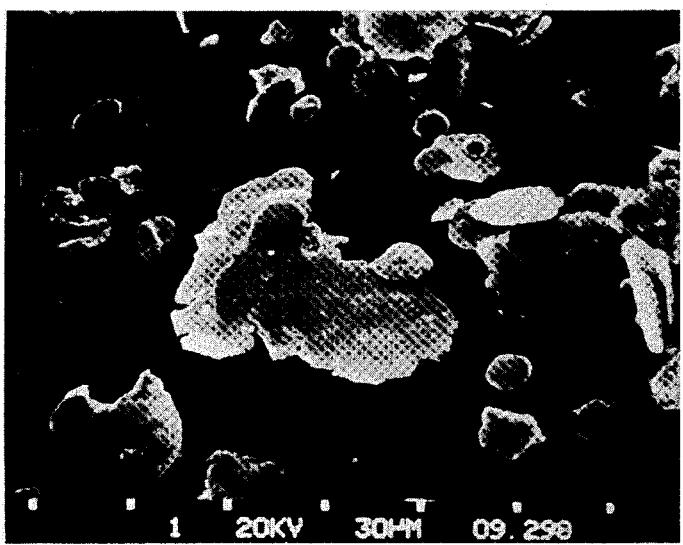
FIG. 3 is a photomicrograph showing the cadmium flakes of FIG. 1 at 500× magnification.
Figure 4:
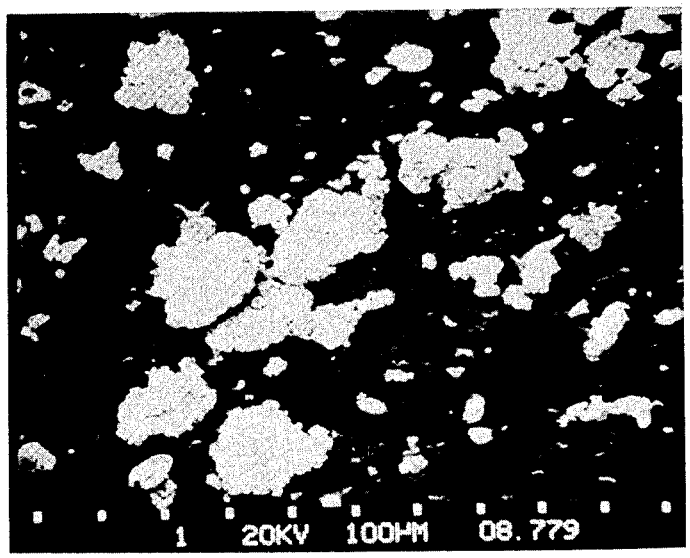
FIG. 4 is a photomicrograph showing flakes of cadmium at 100× magnification.
Figure 5:
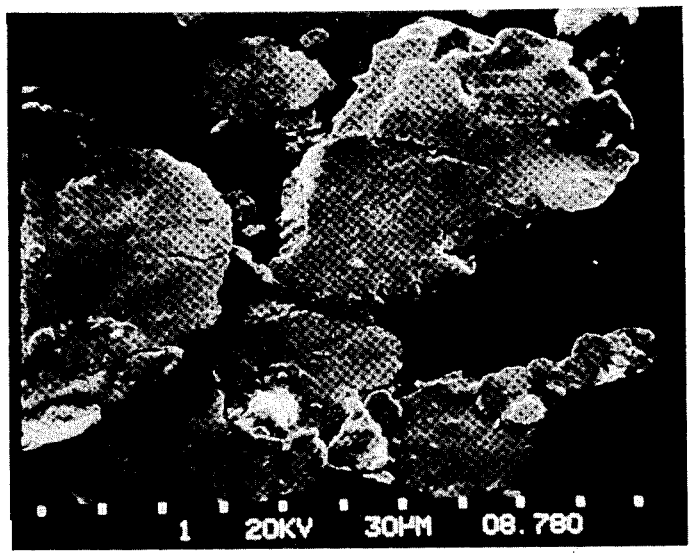
FIG. 5 is a photomicrograph showing flakes of FIG. 4 at 300× magnification.
Figure 6:
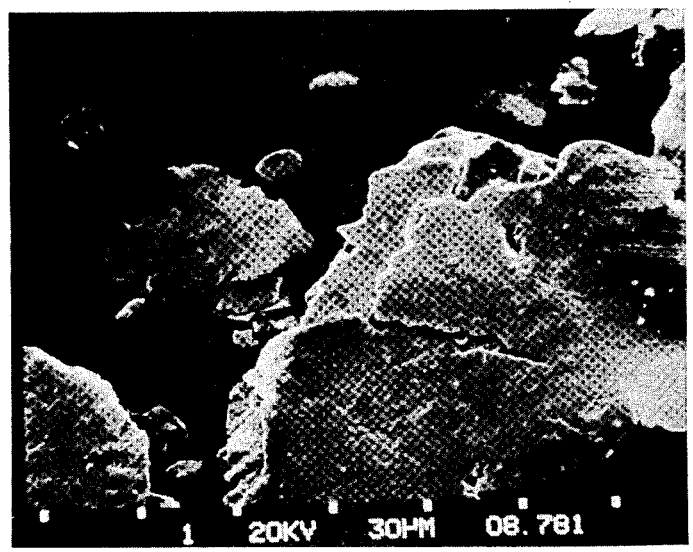
FIG. 6 is a photomicrograph showing the flakes of FIG. 4 at 500×.
Figure 7:
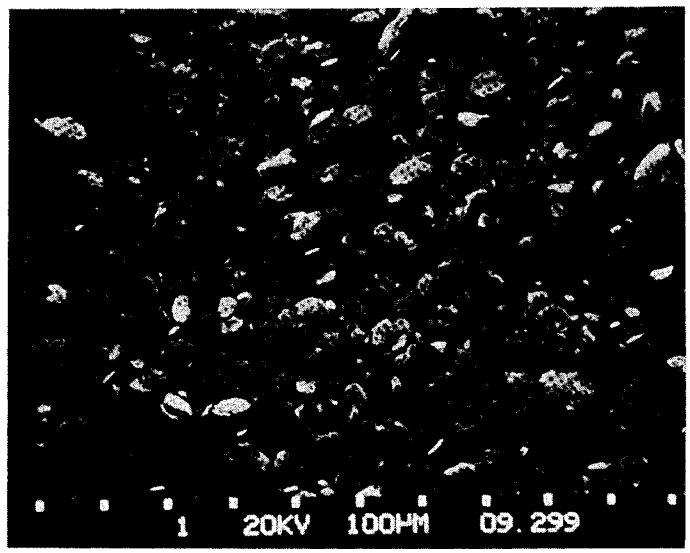
FIG. 7 is a photomicrograph of another batch of flake cadmium at 100×.
Figure 8:
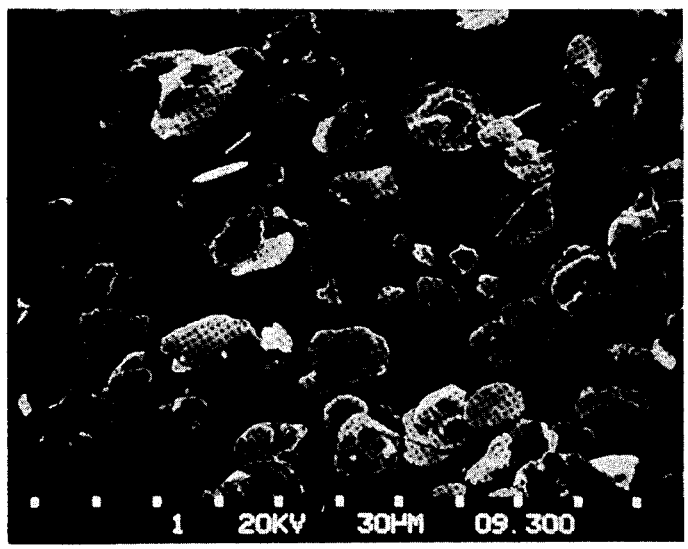
FIG. 8 is a view similar to FIG. 7 showing cadmium flake at 300×.
Figure 9:
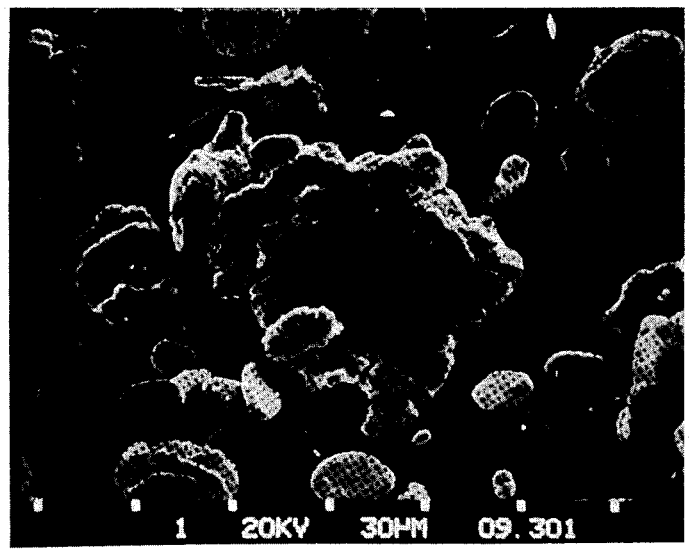
FIG. 9 is a view similar to FIG. 7 illustrating cadmium flake at 500× magnification.

FIGS. 1 through 7 are scanning electron micrographs of cadmium flakes formed, as for example, by grinding and flattening either spherical cadmium of the type of the type made by Asarco having a particle size of about 10 (micron) ±2 or the cylindroidal type of 7 to 22 used by Motorola. Flakes having a thickness less than about 1 micron, as measured utilizing the well-known Fisher Subsieve Sizer technique and scanning electron microscope. As may be seen from the photomicrograph, the reshaped particles are flakes, although some distortion may be shown primarily due to the photomicrographic technique. A process of grinding involving a smashing technique on the individual cadmium particles may be that disclosed in U.S. Pat. No. 4,482,374.

The cadmium flake of certain production lots exhibits certain properties as reflected in the table below:

| CADMIUM FLAKE PROPERTIES | | |
|---|---|---|
| | Production Lot 83-243-1 | Experimental Lot 83-159-1 |
| Apparent Density (g/cm$^2$) | 3.0 | 1.3 |
| Thickness (microns) | 0.9 | 1.0 |
| Dry Screen Analysis (%) | | |
| +150 | 43 | 12 |
| +250 | 20 | 37 |
| +325 | 8 | 13 |
| −325 | 29 | 38 |
| Surface Area (m$^2$/g) | 0.465 | 1.2 |
| Conductivity 1 (ohms/square) | | |
| Before Environmentals | 3000 | 1300 |
| After Environmentals[2] | No Reading | 14 × 10$^5$ |
| Weight Before Environmentals | 5.5026 gm | 4.8925 gm |
| Weight After Environmentals | 5.5190 gm | 4.9064 gm |
| Weight Gain | .0164 gm | .0139 gm |

[1]As measured on a 2 mil thick dry acrylic film.
[2]Environmentals consist of exposure to steam for 1 hour.

Verification of the larger surface area was obtained in somewhat of a crude, but indicative manner. The identical mass of each type was dissolved in concentrated nitric acid. Within 90 sec. (or 1½ minutes) all the flakes had totally dissolved and the reaction ceased. It took 6–7½ minutes for the regular spherical to totally disappear as well as the major bulk of the cylindroidal the last particles of cylindroidal going into solution after about 12 minutes. The results revealed the flake form is far superior in activity, which is intimately related to the surface area. The regular is apparently only slightly more reactive than cylindroidal and is perhaps due to the tighter (10±2) specs, whereas the cylindroidal varies from 7–22μ (micron). Judging from the acid dissolution test, it appears that the vast majority of the cylindroidal particles are relatively close to 10 with the range extending to 22μ.—explaining the fact that the last particles take nearly twice the time to dissolve. The acid dissolution test was performed on each type five times and the results virtually the same as described. The probable explanation as to the success of the cylindroidal powder seems to follow logically from the fact that the vast majority of particles are similar in particle size to the established regular spherical. As a direct result of flakes being nearly ten times more reactive they serve as an excellent discharge reserve.

Furthermore, they will automatically provide excellent overcharge protection against the build up of oxygen, i.e. recombination on the very reactive cadmium should be tremendous. Thus, cells may possibly be charged at extremely high rates without any significant pressure increase. In addition, besides merely being more active, the flake shape will provide this activity in a uniform manner. Extremely active and extremely nonactive sites abound in the powders, corresponding to the irregular peaks and valleys of the constituent powders. On the spikes or protusions, there will be enormous current densities, whilst in the depressions virtually zero. It is quite clear that densification, which is caused by plating out of cadmium from the electrolyte, will be much more rapid and to a greater extent in these non-uniform powders. Plating out or deposition will necessarily occur on the active sites reducing the overall activity of the particle, reducing surface area by increasing densification. For the flakes, however, deposition will be very uniform, because the lack of peaks and valleys on the flat particles, ultimately giving rise to much slower densification. Cells, therefore, whose negative electrode possesses its cadmium discharge reserve in the form of flakes, will have very long cycle life. Flakes, in essence, tend to keep up or maintain the electrodes surface area, while the two powders tend to diminish it. Surface area analysis of the flakes were performed on a Quantasorb instrument and indeed confirmed the high surface area theorized as well as crudely verified by the acid dissolution test. Values of 0.465 m$^2$/gm for the flakes is common while that of the cylindroidal vary from 0.04 m$^2$gm to 0.06 m$^2$/gm in fact, very close to the crudely speculated order of magnitude larger. The regulator spherical is as yet to be done by us but should fare only slightly better than the cylindroidal.

A major consequence of the thin flakes as a result of its high surface area and hence activity, is the quantity necessary to obtain the same results as either the cylindroidal or regular spherical powders. Theoretically, using the flake one-tenth of the mass of powders can be utilized and there would be the same surface area, activity, and conductivity. This value is, of course, based on the magnitude larger surface area as determined experimentally. In fact, a batch of 7/5 AA (700 mAh) cells, were made with 7% cadmium flakes as opposed to 22 percent for the powders. Greater than seven hundred (700) cycles at C charged and discharged rate and 100 percent depth of discharge have been achieved in the cells with maintenance of an energy density in excess of 1.5 WH/inch$^3$ centimeter at the end of more than 700 cycles. A battery made with six of these cells attained 525 cycles before the thermal link—the typical short-circuit protection on a battery—was inadvertently broken by the testing technician. That particular battery was, at the time, holding steady with 97% of rated capacity and thus many more cycles were speculated to have been possible. It is quite obvious that use of less cadmium metal will yield a less expensive cell. Based on present quoted prices for each type of cadmium particles and that one-third mass is necessary to give the same performance when flakes are used, potential cost savings per cost savings of negative electrode of 40% versus regular spherical and 90% versus cylindroidal is recognizable. Alternatively, with the use of more active cadmium metal in the form of flakes, radical electrode composition changes can be made, i.e. Cd(OH)$_2$ to Cd ratio possibly increased, giving rise to a higher capacity negative, which then possesses the ability to support a higher capacity positive. The end result, a higher capacity cell within the same volume.

An additional consequence of the flake discharge reserve design involves the manufacturability of the negative electrode paste. The cadmium powders have a very strong tendency to sediment from the cadmium/cadmium oxide mix. In fact, this tendency is of major concern, since it leads to a possible nonuniform blend. Batches of paste comprising the cadmium flakes do not suffer from this problem. The flat high surface area characteristic of the particles effectively prohibits it from falling out from the blend. This factor may seem minor but nonuniformity, no matter how slight, leads to significant differences in cellular performance in both cycle life and capacity. The use of these ultra thin flakes, therefore, results in a superior product.

According to the present invention, the cadmium electrode comprises a mixture of cadmium oxide, cadmium metal flakes, and an inert hydrophobic binder e.g. polytetrafluoroethylene, which appears to form in situ an open lattice-like mesh support without affecting surface exposure of the metal flakes, wherein the metal flakes are retained within the spaces of the lattice network, the metal flakes being in substantial contact with each other, thereby forming a continuous metal flake matrix within the polytetrafluoroethylene network. Other hydrophobic binders as disclosed in U.S. Pat. Nos. 2,820,077 and 3,870,784 capable of forming in situ similar networks are within the scope of this disclosure. The admixture above is applied to a metal current conducting foraminous substrate, e.g. nickel or nickel-plated steel, calendered and dried whereby the electrode of the invention is fabricated including the in situ formed inert hyrdophobic binder open network as described aforesaid. While the physical relationship of the TEFLON and cadmium flakes have been described above, this is but one description of the physical aspect thereof, but is not intended to be limited thereto.

The admixture above may additionally include other known forms of cadmium metal, e.g. powder, cylindroidal, and cadmium particles of irregular gnarled cylindroidal shape having an average size of approximately 8 to 25 microns and other metals and metal compounds, e.g. carbonyl 255 nickel, nickel hydroxide Ni(OH)$_2$), silver oxide without adversely affecting the unexpected results of the invention. The binder is preferably an aqueous polytetrafluoroethylene dispersion diluted in deionized water.

In order to more fully understand the invention, several examples are herein provided.

EXAMPLE 1

A mixture of dry powders including 22% by weight of cadmium flakes of about one micron in thickness, as measured by a Fisher Subsieve Sizer and scanning electron microscope, and having an apparent density of about 1.34 gm/cm$^3$ and a surface area near 0.465 m$^2$/gm, 0.55% nickel 255 powder, 2.5% nickel hydroxide Ni(OH)$_2$, 0.037% silver oxide, 72.913% cadmium oxide, is added to a 2% dispersion of polytetrafluoroethylene with sufficient excess of water to allow complete hydration of the cadmium oxide. This resultant paste is applied to a nickel or nickel-plated steel current carrier in the form of foraminous or perforated foil. After application, the paste is calendered and dried to form an electrode.

EXAMPLE 2

An electrode is fabricated by the procedure set forth in Example 1 but differ in the percentages of metal and metal compounds employed. In this example, the composition included 7% cadmium flakes, 5% nickel carbonyl 255 powder, 2.5% nickel hydroxide (Ni(OH)$_2$, 0.037% silver oxide, 83.463% cadmium oxide and 2% polytetrafluoroethylene, Teflon, TM, binder.

The blends of Examples I and II are more uniform in composition than those of the normal powdered cadmium. Both compositions yield cells with spectacular performance. Because of the greater surface area and flake geometry of the discharge reserve, as a low as 2.2% cadmium flakes is possible.

RESULTS

Cells fabricated of Example 2 achieved greater than 700 cycles with more than 1.5 watt hours/cubic inch at C charge and discharge and 100 percent depth of discharge. A battery constructed with 6 of these cells reached 525 cycles before the thermal link was accidentally shorted.

Example 1 which as stated as a direct replacement of the cadmium powder by the cadmium flakes, has cells close to 400 cycles with average energy density in excess of 1.96 WH/cubic inch.

The novel cadmium electrode of the invention exhibits properties as stated below:

a. Extremely long cycle life—resulting from the use of very fine particles ($\sim 1\mu$) and the flake-like design. Fundamentally, the time to effective densification is not only expanded but the rate of densification is greatly lowered. Essentially, a compounding of two factors;

b. Better high rate capabilities as a result of the more uniform current distribution/collection and extreme reactivity of the flakes;

c. Better overcharge protection—i.e., improved recombination of oxygen—as a result of the reactivity of the high surface area flakes;

d. A more efficient electrode with improved utilization of the active mass and the occupied volume, thus, enabling a more energy dense negative, which in turn, when matched with a higher positive, yields a higher energy density cell;

e. Less sedimentation of the cadmium flakes in contrast to the powders from the mix of active mass, due to the flake (layer-like) form, ultimately yielding a more uniform blend and a better performing electrode;

f. Significant reduction of the pyrophoric characteristics of the cadmium flake-like particles of cadmium 1$\mu$ micron thick possessing a high surface area because of the uniform reactivity of the flakes as opposed to the spherical or the cylindrical accicular fine powders, which possess areas of super-active sites (high spots) and areas of super-inactive sites (low spots), the super active sites being those which cause the powders to be pyrophoric;

g. A less costly electrode, i.e. one-tenth of the mass of the flakes will be able to replace the normal required mass of the powders, yielding similar performance characteristics, as a result of the order of magnitude of larger surface area (m$^2$/gm) of the flakes.

An improved cadmium negative electrode in accordance with the instant disclosure has been described, it being appreciated that other changes and modifications may be made without departing from the spirit and scope of the invention.

We claim:

1. An improved cadmium electrode comprising a substrate for current distribution, associated therewith an admixture of cadmium oxide and cadmium metal flakes, said flakes having a thickness of less than about one micron, an apparent density about 1.34 gm/Am3 and having a surface area approaching 0.465 m2/gm.

2. An electrode as defined in claim 1 wherein said admixture including an inert hydrophobic polymer binder.

3. An electrode as defined in claim 2 wherein said inert binder is polytetrafluoroethylene.

4. A high energy density battery including the electrode of claim 3.

5. An electrode as defined in claim 2 wherein said percent of cadmium metal flakes is in a range of about 7% to about 22%.

6. An electrode as defined in claim 2 wherein said percent of cadmium oxide is about 73 and percent of cadmium metal flakes is about 22.

7. An electrode as defined in claim 2 wherein said present of cadmium oxide is about 83 percent and said percent of cadmium metal flakes is about 7.

8. An electrode as defined in claim 1 wherein said inert binder is in the form of an open lattice-type network and wherein the metal flakes are retained within the interstices of the network and wherein said flakes are in continuous contacting relationship with each other thereby forming a substantially continuous metal flake matrix within said inert binder network.

9. A high energy density battery including the electrode of claim 8.

10. An electrode for a rechargeable electrochemical cell including a mass of individual cadmium metal flakes.

11. An electrode for a rechargeable electrochemical cell as defined in claim 10 further including a cadmium metal oxide.

12. An electrode as recited in claim 11 wherein said flakes have a magnitude of at least 0.465 m2/gm in surface area.

13. An electrode as recited in claim 12 further including nickel powder, nickel hydroxide and silver oxide.

14. An electrode as recited in claim 11 wherein the percent of combined metal and metal oxide exceeds about 90%.

15. An improved cadmium negative electrode in a high energy density rechargeable cell comprising a substrate for carrying current, and a mass made of cadmium oxide mixed with cadmium metal flakes, said cadmium metal flakes having a thickness of less than about one micron, an apparent density about 1.34 gm/Am3 and having a surface area approximately 0.465 m2/gm.

* * * * *